A. F. MacGLASHAN.
BAGGAGE CARRIER FOR VEHICLES.
APPLICATION FILED FEB. 7, 1917.
1,232,351.
Patented July 3, 1917.
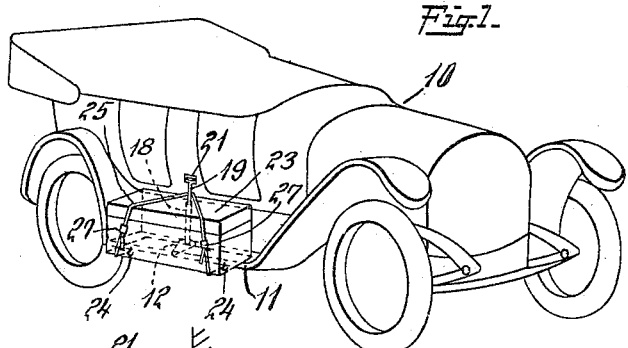
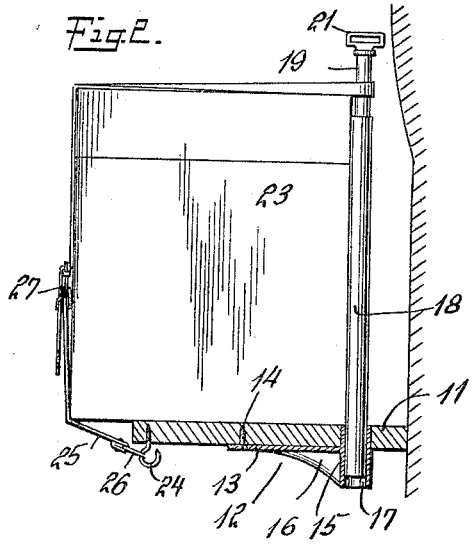
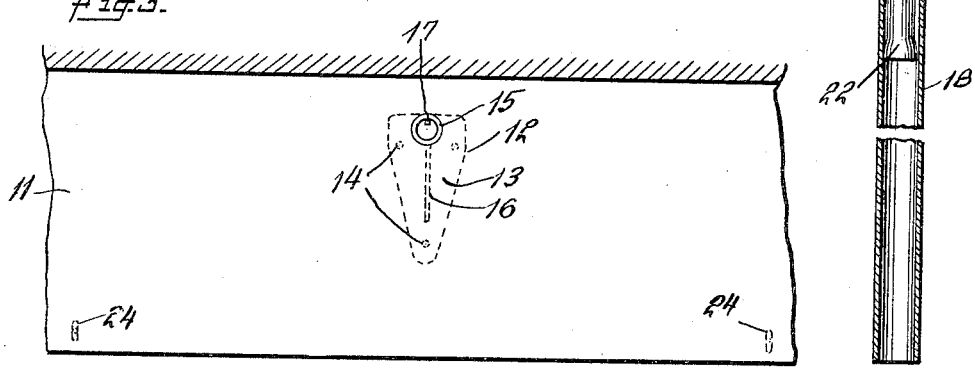
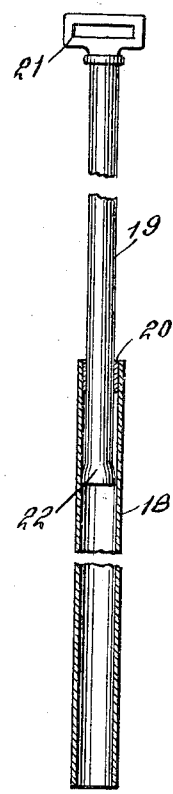
INVENTOR
A. F. Mac Glashan.
BY
Pennie, Davis, Marvin & Edmonds
ATTORNEYS.

UNITED STATES PATENT OFFICE.

ANDREW F. MacGLASHAN, OF BUFFALO, NEW YORK.

BAGGAGE-CARRIER FOR VEHICLES.

1,232,351.   Specification of Letters Patent.   Patented July 3, 1917.

Application filed February 7, 1917.   Serial No. 147,062.

*To all whom it may concern:*

Be it known that I, ANDREW F. MAC-GLASHAN, a citizen of the United States, and resident of Buffalo, in the county of Erie and State of New York, have invented certain new and useful Improvements in Baggage-Carriers for Vehicles, and do hereby declare the following to be a full, clear, and exact description of the invention, such as will enable others skilled in the art to which it appertains to make and use the same.

This invention relates to baggage carriers for vehicles, and more particularly to a device adapted to be attached to the running-board of an automobile to retain any desired article in place. Briefly described, the invention comprises a device for this purpose which is of simple construction and yet is one that possesses a considerable degree of adjustability in order that it may be adapted to articles of various shapes and sizes which it may be desired to carry upon the running-board.

At the same time the construction of the device is such that the baggage may be securely retained in place during travel of the vehicle, even under severe conditions of usage. A further feature of the invention is the provision of a construction in which portions of the device may be easily removed when not in use for their intended purpose, while the parts that are designed to be permanently attached to the running-board of the vehicle are small and in large part concealed on the under side of the running-board.

Other objects and advantages of the invention will appear from a detailed description of one embodiment thereof as illustrated in the accompanying drawing, in which—

Figure 1 is a perspective view showing an automobile with the invention applied thereto; Fig. 2 is an elevation partly in section showing the mode of attaching the device to the running-board of a vehicle; Fig. 3 is a plan view of the upper side of the running-board; Fig. 4 is a view partly in section showing the construction of the telescoping standard of the device, and Fig. 5 is an enlarged view of the lower end of one of the component members of the standard.

Referring now to the drawings, in which similar reference characters denote similar parts throughout the several views thereof, a vehicle which in the present case is an automobile is indicated as a whole by 10. This vehicle is provided with running-boards 11 to one or both of which the device of the present invention may be applied.

12 designates a bracket having a foot portion 13 which is attached to the running-board by means of screws 14. The bracket is provided with a tubular portion or socket 15, the lower portion of which is connected to the foot portion 13 by a rib 16. A lug 17 projects from the interior of the socket near the bottom end thereof.

The socket of the bracket serves as a means for retaining in place a telescoping standard which comprises a tubular member 18 of a size to fit snugly within the socket and a rod 19 slidably mounted in a washer 20 at the upper end of the tubular member 18. Rod 19 is provided with an enlarged head 21 and at its lower end it is flared out as shown at 22, Fig. 5, so that when this rod is drawn out of the tubular member 18 the portion 22 will engage the washer 20 which serves as an abutment to prevent removal of the rod.

The article to be retained in place is shown at 23. Upon the under side of the running-board are attached hooks 24, these hooks being located near the front edge of the running-board and at some distance on either side of the bracket 12, as indicated most clearly in Fig. 3. These hooks serve as means for retaining the ends of a strap 25 which may be provided with rings 26 in order that it may be conveniently secured to the hooks 24 without danger of wearing out the material of the strap, as would occur if it were attached directly. The strap 25 is made up of three sections, two of which are adapted to be connected to the hooks 24 while the intermediate section is connected to the end sections by buckles 27 and passes over the top of the article to be carried and thence around the rod 19.

If it is not desired to carry any baggage upon the running-board the tubular member 18 and rod 19 and the strap 25 may be carried in the tool box or other convenient receptacle of the vehicle. The bracket 12 and hooks 24 being located upon the under side of the running-board are not noticeable when the standard has been removed. By constructing the socket 15 open at the bottom any dirt which may collect upon the running-board will not tend to fill up the socket. When it is desired to use the device the standard is fitted into the socket 15, and the strap 25 is looped around rod 19, which is pulled up to the desired height. The ends of the strap are then attached to hooks 24 and buckles 27 are adjusted to retain the article securely in place. In case it is desired to carry more than one article upon the running-board another device like that described above may be applied. The device is not limited to use upon the running-boards of automobiles, as it is adapted to be applied to other vehicles for the purpose of retaining any desired articles in place upon any part of the vehicle where it can be conveniently mounted. It will also be understood that various changes in the details of construction may be made without departing from the principle of the invention.

I claim:

1. A baggage carrier for vehicles adapted to retain baggage upon the running-board of the vehicle, comprising, in combination with the running-board, a bracket rigidly secured to the underside of the running-board and provided with a socket adapted to receive and retain in place an upright standard, a removable standard adapted to be mounted in said socket and to have fastening means secured thereto, and fastening means adapted to be attached to the standard for securing the baggage in place.

2. A baggage carrier for vehicles adapted to retain baggage upon the running-board of the vehicle, comprising, in combination with the running-board, a bracket rigidly secured to the underside of the running-board and provided with a socket extending through an opening in the running-board, said socket terminating even with the top of the running-board and adapted to receive and retain in place an upright standard, a removable telescoping standard adapted to be mounted in said socket and to have telescoping portions extended to various heights to permit fastening means to be secured thereto, and fastening means adapted to be attached to said telescoping standard for securing the baggage in place.

3. A baggage carrier for vehicles adapted to retain baggage upon the running-board of the vehicle, comprising, in combination with the running-board, a bracket rigidly secured to the underside of the running-board and provided with a socket open at the bottom and adapted to receive and retain in place an upright standard, a removable telescoping standard adapted to be mounted in said socket and to have fastening means secured thereto, said telescoping standard being made up of a tubular member and a rod slidably mounted therein, means for preventing removal of said rod from the tubular member, and fastening devices adapted to be secured to said telescoping standard and to the running-board for securing the baggage in place.

4. A baggage carrier for vehicles adapted to retain baggage upon the running-board of the vehicle, comprising, in combination with the running board, a bracket rigidly secured to the underside of the running-board and provided with a socket adapted to receive and retain in place an upright standard, a removable standard adapted to be mounted in said socket and to have fastening means secured thereto, a plurality of retaining means attached to the running-board near the outer edge thereof and on each side of the said bracket, straps secured to said fastening means, and a strap adapted to be secured to said standard and to the straps secured to said fastening means, whereby the baggage may be encircled and held in place on the running-board by securing said straps together at different points to suit different sizes of baggage.

5. A baggage carrier for vehicles adapted to retain baggage upon the running-board of the vehicle, comprising, in combination with the running-board, a bracket rigidly secured to the underside of the running-board and provided with a socket extending upwardly through a hole in the running-board and terminating even with the top of the running-board, said socket being open at its bottom and adapted to receive and retain in place an upright standard, means for preventing the standard from passing through the open lower end of the socket, a removable telescoping standard made up of a tubular member adapted to be mounted in said socket and a rod slidable therein and adapted to have fastening means secured thereto, means for preventing removal of the rod from the tubular member, retaining means attached to the running-board near the outer edge thereof, and adjustable fastening means adapted to be secured to said standard and to said retaining means for securing baggage of various sizes and shapes in place.

In testimony whereof I affix my signature.

ANDREW F. MacGLASHAN.

Copies of this patent may be obtained for five cents each, by addressing the "Commissioner of Patents, Washington, D. C."